United States Patent
Shiraishi et al.

[11] Patent Number: 5,999,366
[45] Date of Patent: Dec. 7, 1999

[54] ADJUSTABLE DISK CHUCKING MECHANISM FOR HANDLING DIFFERENT SIZED DISKS

[75] Inventors: Chikara Shiraishi, Fujisawa; Tsutomu Nakadai, Yokohama, both of Japan

[73] Assignee: Hitachi Electronics Engineering Co., Ltd., Tokyo, Japan

[21] Appl. No.: 08/937,742

[22] Filed: Sep. 25, 1997

[30] Foreign Application Priority Data

Sep. 25, 1996 [JP] Japan .................................. 8-274101

[51] Int. Cl.⁶ .............................. G11B 17/18; G11B 15/26
[52] U.S. Cl. ...................... 360/99.09; 369/188; 369/258; 369/178
[58] Field of Search ............................. 360/98.04, 98.06, 360/99.09; 369/178, 188, 204, 258, 270

[56] References Cited

U.S. PATENT DOCUMENTS

| | | | |
|---|---|---|---|
| 5,054,016 | 10/1991 | D'Alayer et al. ........................ | 369/270 |
| 5,583,845 | 12/1996 | Aki .......................................... | 369/270 |
| 5,584,638 | 12/1996 | Delaney ................................. | 369/270 X |

FOREIGN PATENT DOCUMENTS

| | | |
|---|---|---|
| 62-84945 | 4/1987 | Japan . |
| 1-48281 | 2/1989 | Japan . |
| 4-310367 | 11/1992 | Japan . |

*Primary Examiner*—William R. Korzuch
*Attorney, Agent, or Firm*—Beall Law Offices

[57] ABSTRACT

A mechanism for chucking a disk with a first and a second roller includes a base plate provided substantially at a right angle to a surface of the disk, and a first and a second rod that are spaced apart and which move along the base plate either toward or away from the disk. A first block is provided which, when the first rod advances or retracts, moves along the base plate and substantially parallel to the surface of the disk, and a first roller is mounted on the first block. A second block is provided which, when the second rod advances or retracts, moves either toward or away from the first roller and the disk, and a second roller is mounted on the second block. A roller position setting mechanism which is secured to the base plate is provided which allows the first rod to move either toward or away from the disk, thereby causing the first block to move along the base plate such that the first roller comes to a position associated with the size of the disk. A drive mechanism is provided for allowing the first and second rods to move either toward or away from the disk.

4 Claims, 4 Drawing Sheets

ADJUSTABLE DISK CHUCKING MECHANISM FOR HANDLING DIFFERENT SIZED DISKS

TECHNICAL FIELD

This invention relates to a disk chucking mechanism, and more particularly, to a mechanism which is capable of adjusting the distance between disk chucking rollers such that different sizes of disks can be chucked with a specified depressing force.

BACKGROUND ART

Disks such as magnetic and optical disks which are information recording media or substrate disks therefor have a hole in the center, through which spindles pass to permit the rotational driving of the disks. Such disks are tested by an inspector to see whether they have any surface defects or if they have sufficient electrical performance to be useful as recording media. The testing process usually comprises providing a cassette containing a plurality of disks, picking up each disk from the cassette by holding it with a disk chucking mechanism and loading it on the inspector. The loaded disk is mounted on a given spindle on the inspector and driven to rotate for testing. After the end of testing, the disk is unloaded from the inspector and either replaced in the same cassette or placed in a different cassette.

FIG. 4 shows an exemplary cassette containing magnetic disks (which are hereunder referred to simply as "disks") and FIG. 5 shows an exemplary disk chucking mechanism which picks up each disk from the cassette. As shown in FIG. 4, individual disks 1 are contained in a box or cassette 2 with an open top such that the periphery of each disk is exposed from the top. Being positioned that way, the disk is chucked at two sites, one being at 1a on the peripheral edge of the exposed part and the other being at 1b on the peripheral edge of the top of the center hole. The thus chucked disk 1 is picked up from the open top of the cassette 2.

The disk chucking mechanism is shown specifically in FIGS. 5(a) and 5(b). FIG. 5a is a schematic side view showing its interior. The disk chucking mechanism (hereunder referred to simply as a "chucking mechanism") 3 comprises a pressure roller 31a having a V-shaped groove and which is to be urged against the peripheral edge 1a of the exposed part of the disk, a pressure roller 31b also having a V-shaped groove and which is to be urged against the peripheral edge 1b of the top of the center hole, as well as air cylinders 32a and 32b for driving these rollers, respectively. The chucking mechanism 3 is mounted on a hand RH provided at the distal end of a handling robot.

The chucking mechanism 3 first drives the air cylinders 32a and 32b such that their piston rods are extended to increase the distance between the two pressure rollers 31a and 31b, as shown by dashed lines in FIG. 5a. The hand RH then pushes the chucking mechanism 3 to have the roller 31b positioned in such a way that the V-shaped groove corresponds to the periphery of the center hole in the disk whereas the roller 31a is positioned in such a way that the V-shaped groove corresponds to the periphery of the exposed part of the disk. Subsequently, the chucking mechanism 3 drives the air cylinders 32a and 32b in directions opposite to the previous ones so that their piston rods contract to reduce the distance between the rollers 31a and 31b, whereupon the disk 1 is chucked with the peripheral edges 1b and 1a being depressed by the V-shaped grooves of the rollers 31b and 31a, respectively.

In another type of the chucking mechanism 3, each of the air cylinders 32a and 32b may be loaded with a coil spring such that the rollers are moved by the urging force of the coil springs during the chucking or unchucking operation. In this case, air may be introduced into the respective cylinders at the time of either chucking or unchucking the disk. For the sake of simplicity, FIGS. 5(a) and 5(b) show the case of chucking the peripheral edge 1a with one roller 31a but, in the usual case, two rollers 31a are spaced apart to depress the peripheral edge 1a of the exposed part of the disk by bringing them closer to the roller 31b in a manner relative to each other. This is in order to ensure that the disk can be chucked with a specified pressure being applied to both the periphery of the center hole in the disk and the periphery of the exposed part of the disk.

Recent versions of disks are available in various sizes in decreasing order of 5.25 inches, 3.5 inches, 3.3 inches, 2.5 inches, 2.0 inches and 1.8 inches. On the other hand, the conventional chucking mechanism 3 is limited in the distance between rollers 31a and 31b and different units of the chucking mechanism are employed for different sizes. Hence, several units of the chucking mechanism 3 are provided to handle the various disk sizes and replacement is made as it becomes necessary. However, the replacement step is by no means efficient since it requires not only manpower but also time. Under the circumstances, it has been desired to develop a chucking mechanism that requires neither replacement operations nor manpower but which can handle various sizes of disk in one unit.

A problem with the conventional chucking mechanism having the aforementioned structure is that if the distance between rollers 31a and 31b is initially set at a large value and then reduced by moving either one of the rollers or both, the roller stroke required to chuck the disk becomes different from one roller to another. This introduces difficulty in chucking the disk with the depressing pressure on its outer and inner peripheral edges being maintained within a predetermined fixed range. If the distance between the rollers is set to comply with larger disks, errors are prone to occur when chucking smaller disks; on the other hand, if the distance between the rollers is set to comply with smaller disks, the required roller-to-roller distance cannot be ensured for larger disks.

SUMMARY OF THE INVENTION

The present invention has been accomplished under these circumstances and has as an object providing a chucking mechanism that is capable of changing the distance between disk chucking rollers such that many disks of different sizes can be chucked with a specified depressing force.

The stated object of the invention can be attained by a chucking mechanism which chucks a disk by a first and a second roller being pressed against an outer and an inner peripheral edge, respectively, of the disk, said mechanism comprising a base plate provided substantially at right angles to a surface of said disk, a first and a second rod that are spaced apart and which move along said base plate either toward or away from said disk, a first block which, when said first rod advances or retracts, moves along said base plate and substantially parallel to the surface of the disk, said first roller being provided on said first block, a second block which, when said second rod advances or retracts, moves either toward or away from said first roller and said disk, said second roller being provided on said second block, a roller position setting mechanism which is secured to said base plate and which allows said first rod to move either toward or away from said disk, thereby causing said first block to move along said base plate such that said first roller comes to a position associated with the size of said disk, and a drive mechanism for allowing said first and second rods to move either toward or away from said disk.

Thus, in the present invention, the first block is provided which moves in a direction parallel to the disk to be chucked and the first rod is advanced or retracted by means of the roller position setting mechanism such that the first block is accordingly moved either away from or towards the outer periphery of the disk. As a result, the distance between the first and second rollers is adjusted to a chuck width which fits the size of the disk to be chucked.

With the distance between the first and second rollers being thusly set to comply with the disk size by means of the roller position setting mechanism, the chucking mechanism is moved by the robot arm such that the first roller is positioned to face the outer periphery of the disk to be chucked, whereupon the second roller automatically moves backward to be positioned near the edge of the inner periphery, or the periphery of the center hole in the disk.

Then, the drive mechanism causes both the first and second rods to move either forward or backward, whereupon the first block comes down towards the outer periphery of the disk and the first roller is urged against the peripheral edge of the disk to depress it. At the same time, the second block moves forward either pivotally or at an angle such that it comes closer to the first roller and the disk, whereupon the second roller projects and abuts against the inner peripheral edge of the disk to depress it. As a result, independently of its size, the disk can be positively chucked between the first and second rollers with a specified depressing force after the rollers have moved by an amount that is determined by the distance the first and second rods are either advanced or retracted under the action of the drive mechanism.

Thus, in the invention, the distance between the chucking rollers is set in accordance with the size of the disk to be chucked, so even if the disk size varies, the roller which depresses the outer peripheral edge of the disk and the other roller which depresses the inner peripheral edge are moved simultaneously to come closer or away from each other by a specified amount, applying a sufficient depressing force to both the outer and inner peripheries of the disk so that it can be chucked positively.

DESCRIPTION OF THE PREFERRED EMBODIMENT

Figure 1:
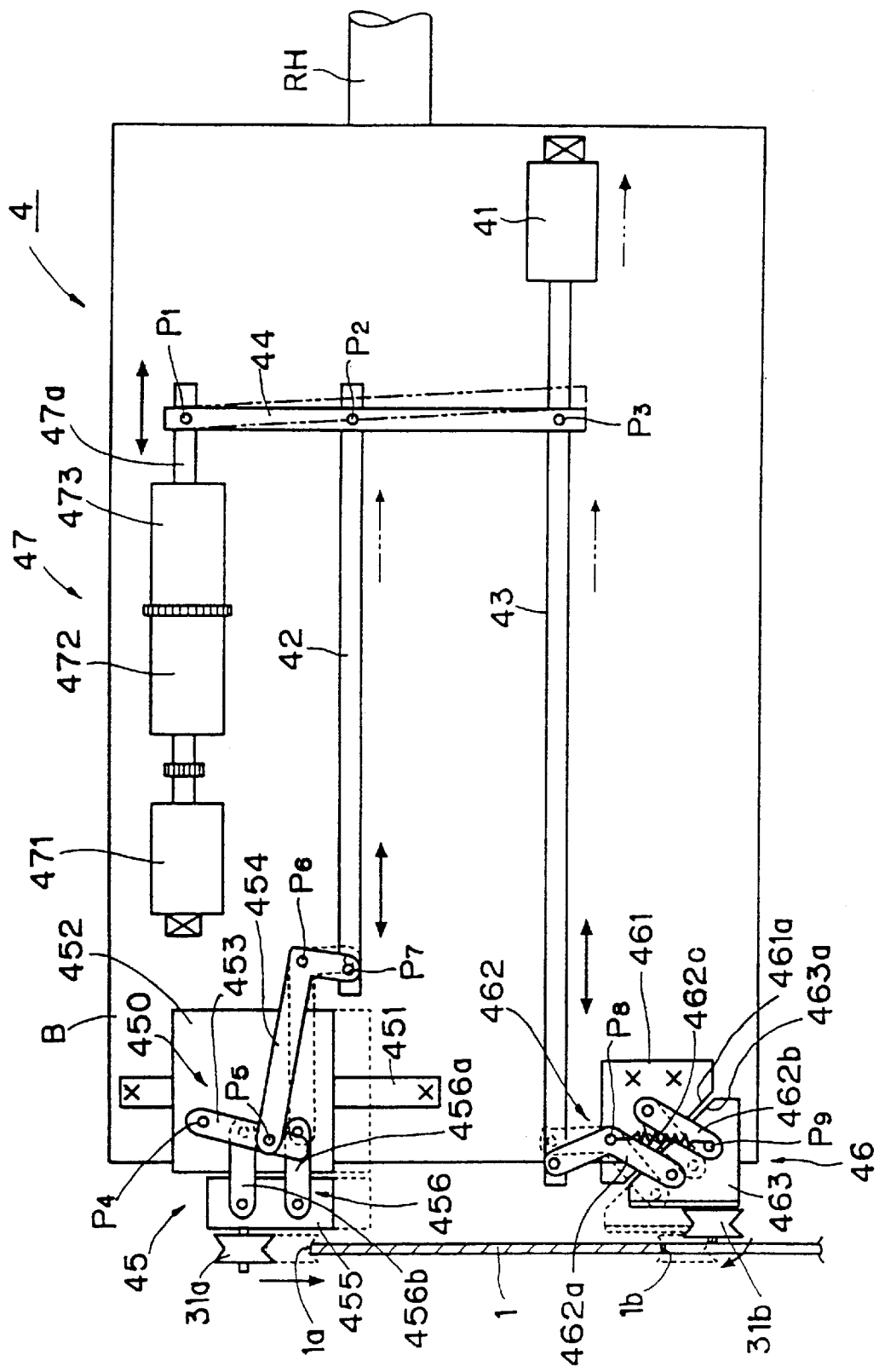
FIG. 1 shows the general layout of an example of the disk chucking mechanism of the invention.

Referring to FIG. 1, a chucking mechanism generally indicated by 4 comprises a depressing air cylinder 41, a connecting rod 44, two rods 42 and 43 provided substantially parallel to each other which are driven with the air cylinder 41 via the connecting rod 44 to move either toward or away from a disk 1, a vertically moving block 455 (corresponding to the first block of the invention) fitted with a roller 31a, a block up/down mechanism (hereunder simply "up/down mechanism") 45 for causing the block 455 to move vertically, a pivoting block 463 (corresponding to the second block of the invention) fitted with a roller 31b, a block pivoting mechanism (hereunder simply "pivoting mechanism") 46 which is connected to an end of the rod 43 to pivotally move the block 463, and a roller position setting mechanism 47. The air cylinder 41, up/down mechanism 45, pivoting mechanism 46 and roller position setting mechanism 47 are supported on a base plate B, which is connected to the hand RH of a handling robot.

Figure 2:
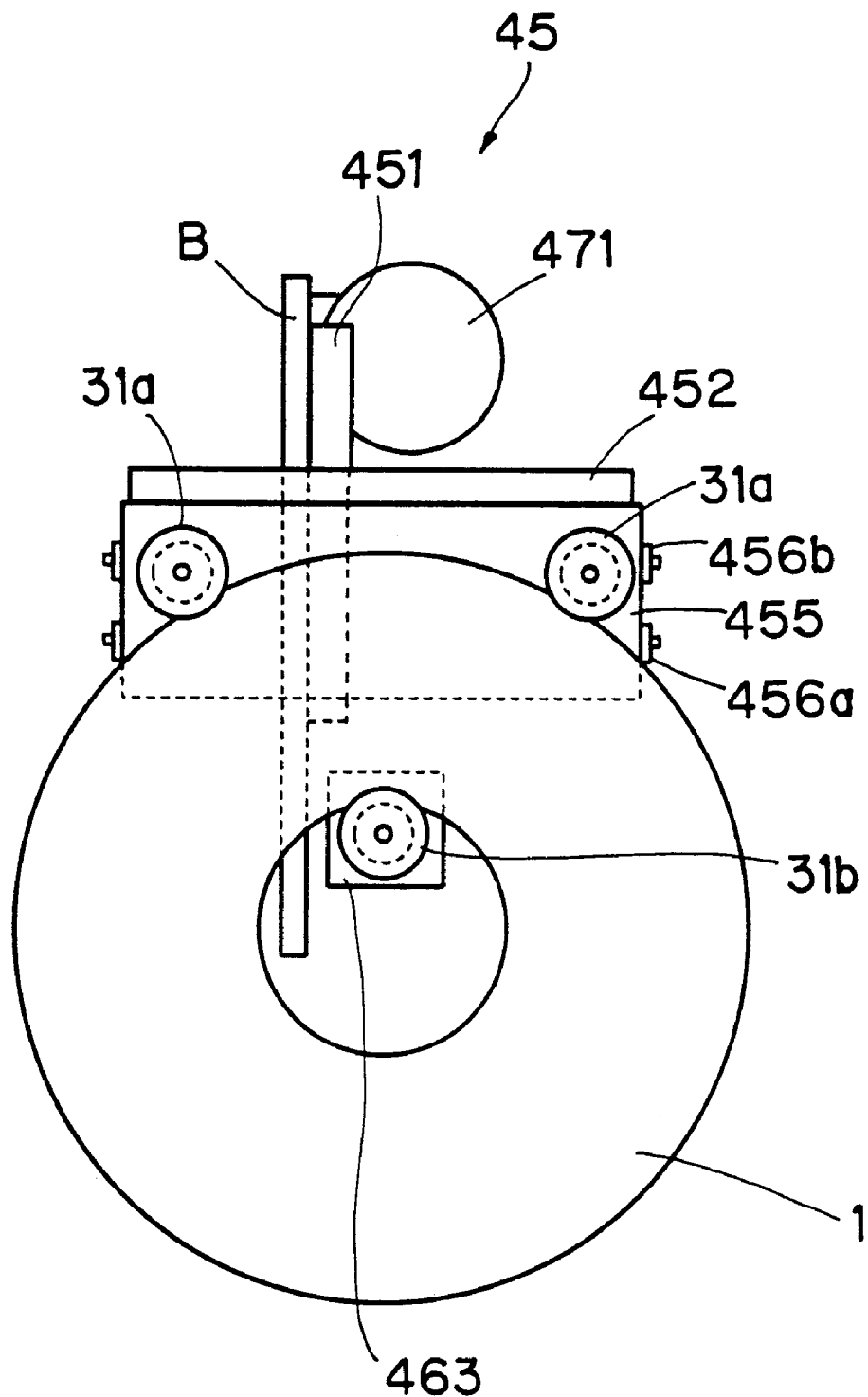
FIG. 2 illustrates how a disk is chucked by said mechanism.

As shown in FIG. 2, two spaced rollers 31a are used to depress the outer peripheral edge 1a of the disk 1 in the embodiment under consideration and only one of them is shown in FIG. 1. The other roller 31a is mounted on the vertically moving block 455 in entirely the same manner as the roller 31a shown in FIG. 1. The following description concerns primarily the roller 31a shown in FIG. 1.

As shown in FIGS. 1 and 2, the disk 1 is positioned vertically. The base plate B is also positioned vertically in a direction perpendicular to a surface of the disk 1. The rods 42 and 43 are supported on the up/down mechanism 45 and the pivoting mechanism 46, respectively, such that they will move along the base plate B to either approach or depart from the disk 1.

The roller position setting mechanism 47 consists of three series connected air cylinders 471, 472 and 473 which are secured to the base plate B. Shown by 47a is a piston rod on the air cylinder 473. Air cylinders 471 and 472 are positioned to face each other and connected by means of their respective piston rods. The rear end of the air cylinder 472 is directly connected to that of the air cylinder 473, thereby making a monolithic cylinder. The rear end of the air cylinder 471 is secured to the base plate B. Because of this arrangement, the three air cylinders 471, 472 and 473 combine together to form a single cylinder which allows the piston rod 47a to move back and forth in three stages.

Let us briefly describe the action of the roller position setting mechanism 47. If the air cylinder 471 is driven to contract, the air cylinder 473 contracts accordingly to the left. As a result, the piston rod 47a assumes the first position of contraction. The air cylinder 472 is next driven to contract; its piston rod causes the air cylinder 473 to contract accordingly to the left. As a result, the piston rod 47a assumes the second position of contraction. Finally, the air cylinder 473 is driven to contract; then, the piston rod 47a will contract to assume the third position of contraction. In an extension mode, the order is reversed; the piston rod on the air cylinder 473 is first driven to extend, then the piston rod on the air cylinder 472 is driven to extend, and finally the piston rod on the air cylinder 471 is driven to extend, thereby reverting to the initial state.

Thus, the series coupled air cylinders allow the piston rod 47a to contract in three stages and extend in three stages to revert to the initial state. As a result, the piston 47a will move either toward or away from the disk 1 in the same manner as the rods 42 and 43. The distal end of the piston rod 47a is coupled to the connecting rod 44 at point P1 which corresponds to an end of the connecting rod 44. The piston of point P1 moves along the base plate B in accordance as the three air cylinders 471, 472 and 473 are driven, respectively. It should be noted that FIG. 1 corresponds to FIG. 3c (to be discussed later) which illustrates how a 3.5-inch disk is chucked. In the case shown in FIG. 3c, the two air cylinders 471 and 472 have been driven to contract, allowing the piston rod 47a to contract through two stages.

The other end of the rod 42 is pivotally coupled to point P2 which is halfway of the connecting rod 44. The other end of the rod 43 is directly coupled to the piston rod on the air cylinder 41 and the other end of the rod 44 is also pivotally coupled to the rod 43 at point P3 as shown in FIG. 1.

The vertically moving block 455 is driven by the up/down mechanism 45 to move vertically along a guide rail 451 and the roller 31a which depresses the outer peripheral edge 1a of the disk 1 is axially supported on the vertically moving block 455.

The up/down mechanism 45 consists of three major components, a slider crank mechanism 450, a bell crank 454 which serves as a crank for the slider crank mechanism 450 and a parallel link assembly 456 which couples the vertically moving block 455 to a slider 452 in the slider crank mechanism 450.

The guide rail 451 along which the slider 452 moves is secured to the base plate B. A connecting link 453 axially coupled to the slider 452 at point P4 is axially coupled to one end of the bell crank 454 at point P5. The other end of the bell crank 454 is axially coupled to one end of the rod 42 at point P7. The bell crank 454 has its fulcrum at point P6 where it is axially supported on the base plate B and pivots in a plane substantially parallel to the base plate 13. The bell crank 454 is coupled to the rod 42 which works as a driver arm and the follower arm of the bell crank 454 serves as a crank for the slider crank mechanism 450.

Having this structure, the bell crank 454 reciprocates about point P6 in accordance as the rod 42 moves either toward or away from the disk 1. The reciprocating motion of the bell crank 454 causes the slider 452 to move up and down via the connecting link 453. When the rod 42 moves toward the disk 1, the slider 452 accordingly goes up. On the other hand, if the rod 42 moves away from the disk 1, the slider 452 comes down. Thus, the height of the slider 452 relative to the disk 1 can be set in accordance with the position reached by the advancing or retracting rod 42.

The vertically moving block 455 is mounted on the slider 452 not directly but indirectly via the parallel link assembly 456. This is because the clearance provided by the parallel link assembly 456 ensures a buffer effect when the disk is chucked by the rollers. The parallel link assembly 456 consists of two parallel links 456a and 456b and helps maintain the lateral side of the vertically moving block 455 parallel to that of the slider 452. For the sake of convenience in explanation, the above-defined clearance is clearly seen in FIG. 1; in fact, however, prior to a chucking action, the block 455 has come down to contact the lateral side of the slider 452 and after the chucking action, the block 455 has gone up to contact the lateral side of the slider 452.

Assume here that the roller 31a has been moved by the roller position setting mechanism 47 to be set at a certain height relative to the disk 1 (the operation of the roller position setting mechanism 47 will be described later). When the rod 42 moves to the right of FIG. 1 (away from the disk 1), the slider 452 comes down and the roller 31a mounted on the vertically moving block 455 moves from the position indicated by the solid line to come to the one indicated by the dashed line. As a result, the roller 31a presses the outer periphery of the disk 1 to bring it to a chucked condition. Conversely, if the rod 42 moves to the left (toward the disk 1), the slider 452 goes up and so does the roller 31a. As a result, the roller 31a goes up from the position indicated by the dashed line to come to the one indicated by the solid line, disengaging the disk 1 from the chucked condition.

We next describe the relationship between the pivoting mechanism 46 and the block 462 which is allowed to pivot by this mechanism. The pivoting mechanism 46 consists of a fixed plate 461 secured to the base plate B and having an inclined surface 461a on the lower front side, a bell crank 462 axially supported at point P8 on the fixed plate 461 and pivoting in a plane substantially parallel to the base plate B, and a parallel link 462b which is axially supported on the fixed plate 461.

The pivoting block 463 has an inclined surface 463a on the upper rear side which is in a face-to-face relationship with the inclined surface 461a of the fixed plate 461. The block 463 is axially supported on the base plate B via the fulcrum (P8) of the bell crank 462 and the fixed plate and it pivotally moves either toward or away from the disk 1 and the roller 31b which is rotatably supported on a shaft extending from the block 463 to depress the inner peripheral edge 1b of the disk 1.

The bell crank 462 is coupled to the rod 43 which serves as a driver arm and an end of the follower arm is axially coupled to the block 463. Having this structure, the pivoting mechanism 46 causes the block 463 to pivot in accordance with the forward or backward movement of the rod 43, whereupon the roller 31b moves toward or away from the disk 1 and the roller 31a.

In the case shown in FIG. 1, the link 462b is provided parallel to the follower arm 462a of the bell crank 462. In addition, a coil spring 462c is provided compressed between point P8 which is the fulcrum of the bell crank 462 and point P9 which is the fulcrum of the link 462b located on the block 643. Under the action of the coil spring 462c, the block 643 normally projects toward the disk 1 a little beyond the position indicated by the dashed line, causing the inclined surface 463a to touch the inclined surface 461a.

As shown in FIG. 1, the inclined surface 463a of the pivoting block 463 and the inclined surface 451a of the fixed plate 461 are in a face-to-face relationship and coupled by means of the parallel links, with a certain clearance provided therebetween. As in the case of the aforementioned vertically moving block 455, the clearance provides a buffer effect when the disk is chucked by the rollers; in addition, the clearance allows the parallel links to pivot through a sufficiently increased angle to have the roller 31b project by an increased amount toward the disk 1 and the roller 31a.

Having described above the specific construction of the chucking mechanism of the invention, let us assume that prior to a disk chucking operation, the rod 43 moves toward the disk 1, causing the roller 31b to retract in counteraction against the force of the coil spring 462c. Similarly, the roller 31a goes up to depart from the outer periphery of the disk 1. The positions of the respective rollers in this state are shown by the solid lines in FIG. 1.

When the rod 43 moves to the right of FIG. 1 (away from the disk 1), the pivoting block 463 not only comes closer to the disk 1 but also goes up to approach the roller 31a, which in turn comes to the position indicated by the dashed line. The roller 31b also moves from the position indicated by the solid line to come to the position indicated by the dashed line, where it depresses the inner peripheral edge 11D of the disk 1 to bring it to a chucked condition. In this chucked condition, the coil spring 462c assists in depressing the inner peripheral edge 1b of the disk 1 under a specified pressure and, at the same time, it provides a sufficient relief to ensure that a more-than-necessary force will not be exerted on either the outer or the inner periphery of the disk 1. Conversely, if the rod 43 moves to the left (toward the disk 1), the pivoting block 463 counteracts the compressive force of the coil spring 462c and returns to the position indicated by the solid line, causing the roller 31b to come down. As a result, the roller 31b departs not only from the roller 31a but also from the disk 1. Thus, the distance between the rollers 31a and 31b increases to disengage the disk 1 from the chucked condition, with the roller 31a also assuming the position indicated by the solid line.

If desired, a coil spring fulfilling the same functions as the coil spring 462c may be loaded between the diagonal axes of the parallel link assembly 456 which couples the slider 452 to the vertically moving block 455. In this case, the coil spring 462c may be omitted.

In short, when the rods 42 and 43 move away from the disk 1 (move to the right), the up/down mechanism 45 and the pivoting mechanism 46 combine to bring the rollers 31a and 31b sufficiently close to each other to chuck the disk 1. Conversely, if the rods 42 and 43 move toward the disk 1 (move to the left), the disk 1 comes out of the chucked condition. This reciprocal movement of the rods 42 and 43 is activated by the air cylinder 41 via the connecting rod 44. If the air cylinder 41 causes the rod 43 to advance, the connecting rod 44 comes to the position indicated by the solid line and the rod 42 is also advanced. If the air cylinder 41 causes the rod 43 to retract, the connecting rod 44 comes to the position indicated by the two-short-and-one-long dashed line and the rod 42 is also retracted.

Now, as already mentioned, FIG. 1 shows the case where the two air cylinders 471 and 472 have driven the piston rod 47a to contract through two stages. In the embodiment under discussion, this case corresponds to the chucking of a 3.5-inch disk. However, the embodiment under discussion has the advantage that varying sizes of disks can be chucked by the rollers 31a and 31b which will make the same actions as described in the preceding paragraphs. This is because the position of point P3 does not change but the position of point P2 on the rod 42 changes in accordance with the position of point P1 on the rod 44, thereby causing the slider 452 to change its vertical position. As a result, the distance between the rollers 31a and 31b can be set in accordance with the specific size of the disk 1. To this end, the height of the roller 31a is set by the roller position setting mechanism 47.

As already mentioned, the roller position setting mechanism 47 consists of three air cylinders 471, 472 and 473 which are driven in succession to change the length of the piston rod 47a, whereupon the position of point P1 on the rod 44 changes from right to left or vice versa with reference to the point P3 at which the rod 44 is coupled to the rod 43. As a result, the slider 452 is moved vertically to set the roller 31a in a position that complies with the size of the disk 1.

Figure 3A:
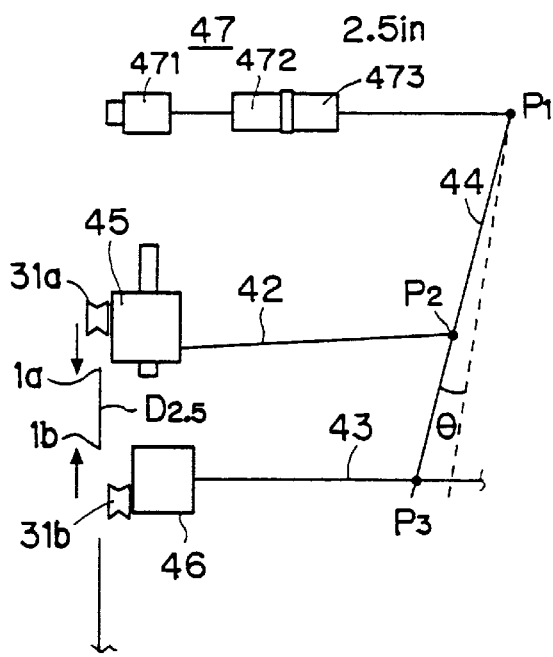
FIGS. 3a –3d illustrate how a roller position setting mechanism operates to handle disks of 2.5, 3.3, 3.5 and 5.25 inches, respectively.

We now describe how this action of the roller position setting mechanism 47 which sets the position of point P1 is related to the disk chucking operation. FIG. 3a refers to the case where the three air cylinders 471, 472 and 473 remain inactive. This corresponds to the case of chucking a 2.5-inch disk. As shown, point P1 is located on the rightmost end. FIG. 3d refers to the case where the three air cylinders 471, 472 and 473 have been driven to contract. This corresponds to the case of chucking a 5.25-inch disk. As shown, point P1 is located on the leftmost end. In accordance as the air cylinders 471, 472 and 473 are driven to contract in succession, point P1 shifts from right to left, allowing larger disks to be chucked in the increasing order of (b), (c) and (d).

In addition, in the absence of any change that occurs in the position of point P3 no matter where the point P1 is located, the air cylinder 41 will perform substantially the same operation in both the disk chucking and unchucking modes in each of FIGS. 3a –3d. This is because if the connecting rod 44 is assumed to be located in the position indicated by the dashed line in each of FIGS. 3a –3d, the two rods 42 and 43 will both move to the right, causing the rollers 31a and 31b to depress the outer peripheral edge 1a and the inner peripheral edge 1b, respectively, of the disk 1, thereby chucking it. When the connected rods 42 and 43 move to the left, the rollers 31a and 31b both depart from the disk 1 to disengage it from the chucked condition. In each of FIGS. 3a –3d, the procedures of chucking and unchucking the disk 1 are accomplished by the depressing air cylinder 41 which causes the connecting rod 44 to pivot around point P1 to move from the position indicated by the solid line and come to the position indicated by the dashed line. For this purpose, the connecting rod 44 may be designed to be comparatively long enough to ensure that the angle θ through which it pivots about point P1 will not change significantly in response to the change in either direction in the position of point P1.

Since the position of point P3 does not change throughout the chucking and dechucking operations, the amounts of movement of the rods 42 and 43 that are required for chucking the disk 1 will hardly change. Therefore, the amount of movement of the rollers 31a and 31b that is required for chucking the disk 1 can also be rendered hardly variable in spite of the change of its size. As a result, the depressing force that is exerted on the disk by the respective rollers can also be determined by the force to drive the air cylinder 41 independently of the size of the disk to be chucked. Hence, the force of depression by the rollers can be set within a specified range even if the disk size varies.

It should be noted that in FIGS. 3a –3d, for the purpose of clarifying the respective values of pivoting angle θ, the horizontal lengths of the rods 42 and 43 as compared with the connecting rod 44 are shown to be somewhat shorter than in the case shown in FIG. 1. In FIGS. 3a –3d, the size of disk 1 is 2.5, 3.3, 3.5 and 5.25 inches, respectively, as distinguished by the subscript following the letter D (D for disk).

FIG. 3a refers to the case where the air cylinders 471, 472 and 473 are all in an extended condition and none of them are activated for a contraction movement. In this case, point P1 has moved to the rightmost end and stops there. This corresponds to the case of chucking the disk of minimal size, $D_{2.5}$, with both rollers 31a and 31b having retracted from the disk to the positions indicated by the solid lines.

Figure 3B:
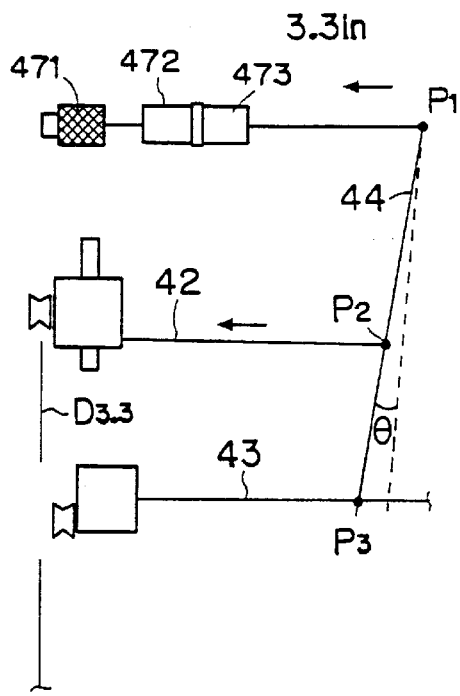

FIG. 3b refers to the case where only the air cylinder 471 has been driven to contract, causing point P1 to move a little to the left for chucking disk $D_{3.3}$. In this case, the connecting rod 44 pivots counterclockwise about point P3, causing the rod 42 to move to the left. As a result of this movement to the left, the working position of the roller 31a for depressing the outer peripheral edge of the disk is set to be sufficiently higher than in the case of FIG. 3a that it is positioned in correspondence with the outer peripheral edge 1a of disk $D_{3.3}$. On the other hand, the rod 43 does not move at all, so the working position of the roller 31b for depressing the inner peripheral edge of the disk is the same as in the case of FIG. 3a. Both rollers 31a and 31b will act in the same manner as in the case of FIG. 3a, thereby chucking the disk $D_{3.3}$. In FIG. 3b and subsequent FIGS. 3c and 3d, the air cylinders that have been driven to contract are crosshatched.

Figure 3C:
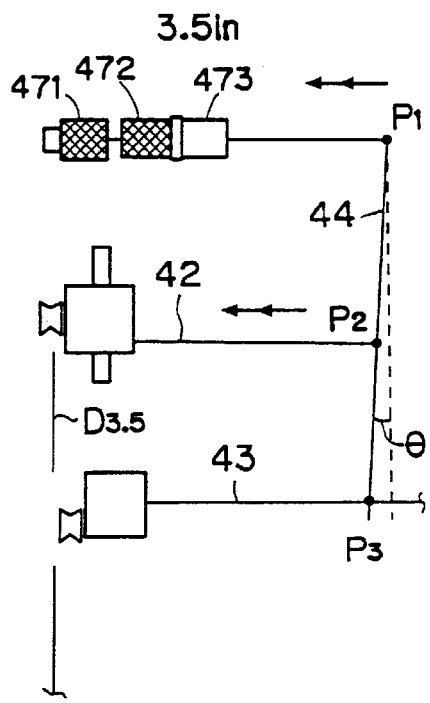
Figure 3D:
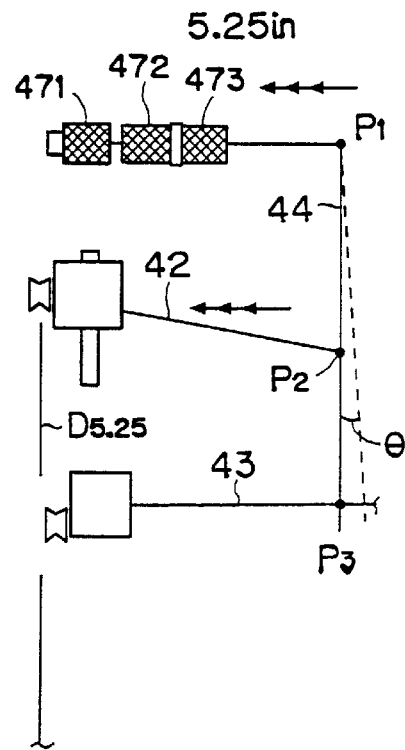
Figure 4:
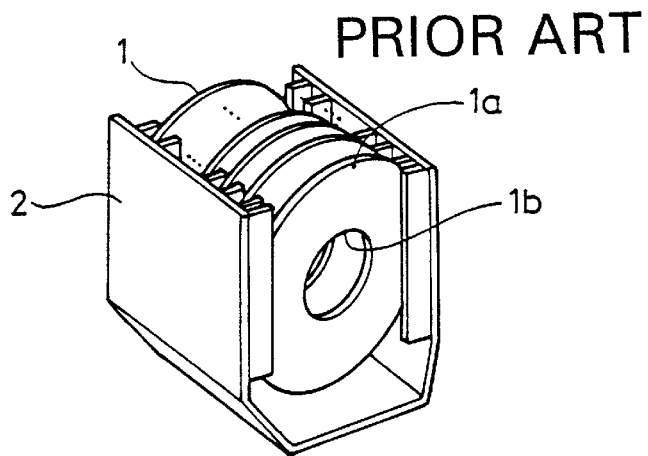
FIG. 4 shows a cassette containing a plurality of disks.
Figure 5B:
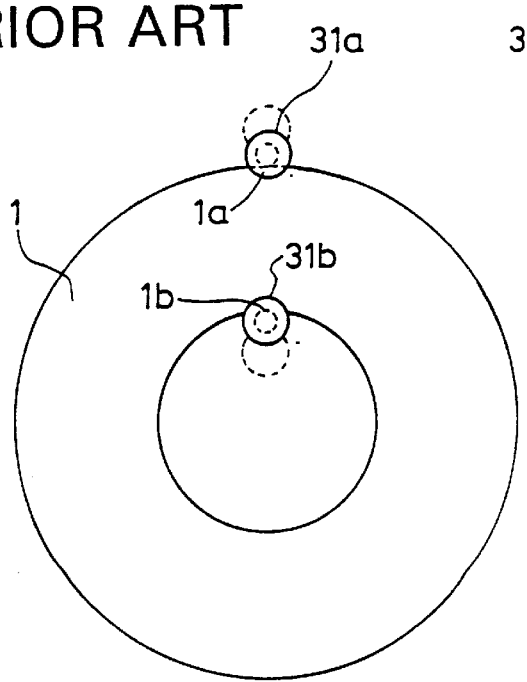
FIG. 5b illustrates how the mechanism operates to chuck a disk.
Figure 5A:
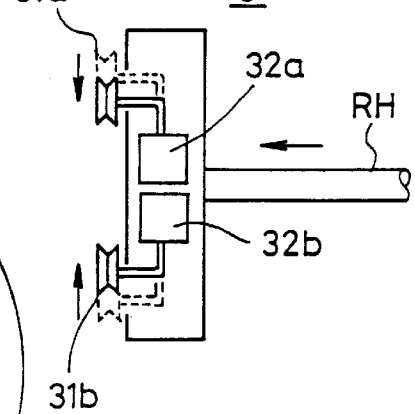
FIG. 5a is a schematic side view of a prior art disk chucking mechanism.

FIG. 3c refers to the case where both air cylinders 471 and 472 have been driven to contract, causing point P1 to move further to the left for chucking disk $D_{3.5}$. In this case, the connecting rod 44 and the rod 42 move further to the left and the working position of the roller 31a is set to be even higher than in the case of FIG. 3b. As a result, it becomes possible to chuck the disk $D_{3.5}$, as shown specifically in FIG. 1.

FIG. 3d refers to the case where all air cylinders 471, 472 and 473 have been driven to contract, causing the roller 31a to be set in a position capable of depressing the outer peripheral edge of disk $D_{5.25}$. Obviously, the working position of the roller 31a is set to be even higher than in the case of FIG. 3c, rendering it possible to chuck the disk $D_{5.25}$.

The actions of the individual parts of the chucking mechanisms shown in FIGS. 3a–3d are identical to those described in the preceding paragraphs.

The heights of the respective rollers can be adjusted in accordance with the disk size by controlling the lengths of the piston rods to be driven with the air cylinders 471, 472 and 473, the lengths of the arms of the bell crank 454 and the length of the connecting link of the slider crank. It should also be added that the roller position setting mechanism is by no means limited to the tandem cylinders of the illustrated case and more disk sizes can be handled by adapting them to be movable in four or more stages.

In the foregoing description of the embodiment of the invention, the vertically moving block is coupled to the slider via the parallel link assembly but this is not the sole case of the invention and, if desired, said block may be directly coupled to the slider; alternatively, the vertically moving block may be an integral part of the slider. In the embodiment, the pivoting block is adapted to pivotally move either toward or away from the disk 1 and the roller 31a; alternatively, said block may be adapted to move at an angle such that it approaches or departs from the disk 1 and the roller 31a. It should also be noted that the roller position setting mechanism described in the embodiment is also just an example and the drive source is by no means limited to air cylinders.

One additional comment seems necessary before closing the description. In the embodiment, the disk is adapted to be chucked by retracting the rods. Alternatively, the disk may be adapted to be chucked by advancing the rods. This can be realized by merely adding a member or mechanism such as a lever or a bell crank that is capable of reversing the direction of movement. As a result, an advancing movement will replace the retracting movement. Thus, the advancing motion of the rods in the embodiment may be replaced by a retracting motion and vice versa and this can be easily accomplished by providing a member for reversing the direction of either movement, with the same actions being achievable if the advancing motion is replaced by a retracting motion or vice versa.

What is claimed is:

1. A disk chucking mechanism which chucks a disk with a first and a second roller being pressed against an outer and an inner peripheral edge, respectively, of the disk, said mechanism comprising a base plate provided substantially at a right angle to an information surface of said disk, a first and a second rod that are spaced apart and which move longitudinally along said base plate either toward or away from said information surface of said disk, a first block connected to said first rod which, when said first rod advances or retracts longitudinally, moves along said base plate and substantially parallel to the information surface of the disk, said first roller being provided on said first block, a second block connected to said second rod which, when said second rod advances or retracts longitudinally, moves either toward or away from said first roller and said disk, said second roller being provided on said second block, a roller position setting mechanism which is secured to said base plate and which allows said first rod to move either toward or away from said disk, thereby causing said first block to move along said base plate such that a distance between said first roller and said second roller is adjusted to a chuck width associated with the size of said disk, and a drive mechanism for allowing said first and second rods to move longitudinally either toward or away from said information surface of said disk independently of any movement of said base plate, said drive mechanism either advancing or retracting said second rod together with said first rod which has been set in a specified position by said roller position setting mechanism and wherein said second block either pivots or moves at an angle in accordance as said second rod advances or retracts, thereby moving either toward or away from said first roller and said disk;

a first crank which is axially supported on said base plate such that it is capable of pivoting in a plane substantially parallel to said base plate and which is coupled at one end to an end of said first rod such that it is driven by said drive mechanism via said first rod, and which further includes a slider crank mechanism which has a slider which slides along said base p1a te and a first connecting link, said first connecting link coupling the other end of said first bell crank to said slider such that the other end of said first bell crank works as a crank to move said slider, and wherein said first block is supported on said slider;

a second bell crank which is secured to said base plate such that it is capable of pivoting in a plane substantially parallel to said base plate, with an end of said second bell crank being coupled to an end of said second rod such that it is driven by said drive mechanism via said second rod, and wherein said second block is coupled to the other end of said second bell crank; and wherein said disk is a magnetic disk or a substrate disk therefor and wherein said first and second rollers each have a V-shaped groove, said first roller consisting essentially of two spaced rollers which are each axially supported on said first block and said second roller being axially supported on said base plate via a second connecting link such that said second block is capable of pivoting and said first block is supported on said slider by being coupled thereto via a parallel link assembly; and a third rod that is supported at one end on said roller position setting mechanism such that it is capable of sliding parallel to said base plate, said third rod being pivotally coupled at an intermediate point to the other end of said first rod and being pivotally coupled at the other end to an intermediate point of said second rod, with the other end of said second rod being coupled to said drive mechanism and said first rod being either advanced or retracted by said drive mechanism via said second rod and said third rod.

2. The disk chucking mechanism according to claim 1, wherein said roller position setting mechanism includes a fourth rod capable of either an advancing or retracting motion and wherein said one end of said third rod is pivotally coupled to the distal end of said fourth rod, said roller position setting mechanism either advancing or retracting said fourth rod in accordance with the size of said disk.

3. The disk chucking mechanism according to claim 2, wherein said base plate is coupled to a handling arm and wherein said roller position setting mechanism and said drive mechanism each have at least one air cylinder.

4. The disk chucking mechanism according to claim 3, wherein said roller position setting mechanism consists essentially of a plurality of series connected air cylinders and which allows said other end of said third rod to move toward said disk through multiple stages in accordance with the size of said disk, said fourth rod being the piston rod of an end air cylinder of said series connected air cylinders, and wherein said drive mechanism causes said second rod to move away from said disk in a mode of chucking said disk.

* * * * *